June 24, 1930.  H. P. BASSETT  1,766,810
PROCESS OF MAKING ALKALI METAL SULPHYDRATES
Filed March 24, 1927
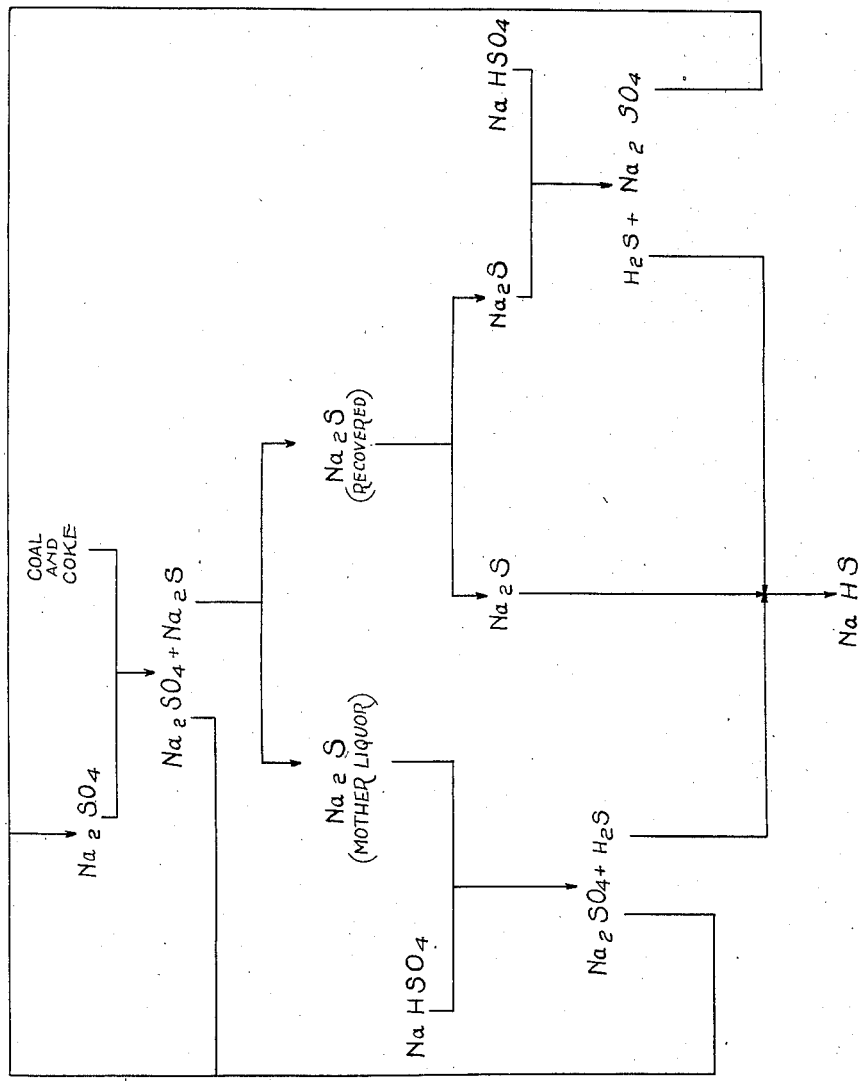
Inventor
HARRY P. BASSETT
By C. L. Parker Jr.
Attorney Patented June 24, 1930

1,766,810

UNITED STATES PATENT OFFICE

HARRY P. BASSETT, OF CYNTHIANA, KENTUCKY

PROCESS OF MAKING ALKALI-METAL SULPHYDRATES

Application filed March 24, 1927. Serial No. 178,153

This invention relates to processes of making alkali metal sulphydrate and has for its principal object to provide a simple and economical method of producing alkali metal sulphydrate and particularly sodium sulphydrate.

This is a continuation-in-part of my Patent No. 1,662,735.

The figure shown in the drawing is a flow sheet illustrating my invention.

In the practice of my process, an alkali metal sulphate preferably sodium sulphate, is mixed with carbonaceous matter and furnaced to reduce the greater part of the sulphate to sulphide. In making use of sodium sulphate, I prefer to mix it with finely divided bituminous coal and coke preferably ground to pass through a 40 mesh sieve, in the preferred proportions of 300 pounds of anhydrous sodium sulphate or a correspondingly greater amount of the salt containing water of crystallization, 100 pounds of coal and 105 pounds of coke. This mixture or charge is furnaced in a reducing atmosphere preferably in a continuous rotary furnace, at a temperature of from about 650° to 850° C., until by far the greater part of the sodium sulphate is reduced to sodium sulphide. By heating the charge for from one and one-half to two hours at a temperature of from about 775° to 825° C. and preferably at about 780° C. more than 90 per cent of the sodium sulphate will be reduced, it being possible in some instances to obtain a yield of as high as 96 per cent sodium sulphide.

The resulting cinder is leached with water, sufficient water being used to obtain a solution of sodium sulphide and unreduced sodium sulphate of about 25° Baumé.
The sodium sulphate is then removed from the sodium sulphide solution preferably by evaporating the solution to a density of about 42° Baumé, at which density of the solution practically all of the sodium sulphate present will be precipitated. The sodium sulphate is separated as by filtration, without allowing the heated solution of sodium sulphide to cool and is employed in the further practice of the first step of the process in which sodium sulphide is produced. The filtrate is diluted back to about 34° Baumé and allowed to cool whereupon somewhat more than half and ordinarily about 60 per cent of the sodium sulphide in solution is crystallized out. These crystals may be advantageously washed with a small amount of water or pure sodium sulphide solution and practically chemically pure sodium sulphide obtained.

The mother liquor is then treated with sodium acid sulphate to produce hydrogen sulphide and sodium sulphate. I prefer to use a solution of a sufficient amount of nitre cake to be neutralized by the sodium sulphide, the nitre cake solution employed being preferably of about 20° Baumé density. The hydrogen sulphide gas produced as described is added to a solution of the sodium sulphide crystals such crystals being preferably first purified as described, to produce sodium sulphydrate. The sodium sulphate solution preferably after being evaporated to or near dryness, is used in the further practice of the first step of the process.

If when the mother liquor is treated with sodium acid sulphate an insufficient amount of hydrogen sulphide gas is produced to supply the amount of such gas required to convert the sodium sulphide crystals into sodium sulphydrate as described above, a portion of the sodium sulphide crystals, preferably the amount in excess or the amount which can be converted into sodium sulphydrate by the hydrogen sulphide produced by treating the mother liquor with sodium acid sulphate, is dissolved in water and this solution divided into two parts. One part is then treated with sodium acid sulphate to produce hydrogen sulphide and sodium sulphate, and the hydrogen sulphide gas produced is then passed into the other part of the sodium sulphide solution to convert the sodium sulphide into sodium sulphydrate. The sodium sulphate remaining in the first solution, preferably after being evaporated to or near dryness, is used in the further practice of the first step of the process.

The production of the sodium sulphide in the first step of the process is inexpensive. The charge requires the application of little or no heat after being initially heated to from about 650° to 850° C., a temperature sufficiently high to effect the reduction of the sulphate to sulphide being thereafter maintained wholly or almost entirely by combustion in the charge. The sodium sulphate in the initial charge is produced in the subsequent steps of the process and only sufficient additional sodium sulphate is needed to make up operation losses. The coke in the leached cinder is in excess of the amount initially used in the charge so that a portion of such cinder supplies the coke required in making up the charge treated in the first step of the process.

Removing the sodium sulphate from the sodium sulphide solution is effected without great expense merely by heating the evaporated solution to a density of about 42° Baumé and the greater part of the sodium sulphide in the remaining solution is recovered in crystalline form by diluting the solution back to the required density and allowing it to cool. By obtaining this sodium sulphide in crystalline form it is possible to make it practically chemically pure by washing with a small amount of water or pure sodium sulphide solution. The addition of the hydrogen sulphide gas to the pure sodium sulphide solution produces sodium sulphydrate of a very high degree of purity suitable for use in the arts and particularly suitable for use in the artificial silk industry.

From the foregoing description, it will be noted that my process is a cyclic one requiring, except to make up for plant losses only the use of carbonaceous matter such as bituminous coal and sodium acid sulphate which is available at low cost in the form of nitre cake.

It will be understood that other alkali metal sulphates than the sodium sulphate may be employed in the practice of my process by such modifications as will be apparent to those skilled in the chemical arts.

While I prefer to make use of alkali metal sulphates in the practice of my process, some considerable measure of success is obtainable by the use of other sulfur containing alkali metal salts, such as the sulphites and thio-sulphates and they are accordingly to be regarded as the equivalents of the sulphates in the practice of my process.

While I have described in detail the preferred practice of my process and the preferred proportions of ingredients employed therein, it is to be understood that the details of procedure and the proportions of ingredients may be widely varied and that known chemical equivalents of the reagents employed may be used, all without departure from the spirit of my invention or the scope of the subjoined claims.

I claim:

1. The herein described process of making an alkali metal sulphydrate which comprises partially reducing an alkali metal sulphate to produce a sulphide and a sulphate of such alkali metal, separating the alkali metal sulphate from a solution of such sulphide and sulphate, crystallizing out a portion of the alkali metal sulphide contained in the remaining solution, dissolving the crystals thus formed with water, dividing such solution into two parts, treating the mother liquor and one portion of the alkali metal sulphide solution with an alkali metal acid sulphate to produce hydrogen sulphide and alkali metal sulphate and reacting upon the other portion of the solution of the alkali metal sulphide with the hydrogen sulphide to produce alkali metal sulphydrate.

2. The herein described process of making an alkali metal sulphydrate which comprises reducing an alkali metal sulphate to produce alkali metal sulphide and sulphate, separating the sulphate by evaporating a solution of the alkali metal sulphide and sulphate to a density at which the alkali metal sulphate is precipitated, removing the precipitated alkali metal sulphate, diluting and cooling the remaining solution to crystallize out a portion of alkali metal sulphide contained therein, separating the crystals from the mother liquor, dissolving the crystals thus formed with water, dividing such solution into two parts, treating the mother liquor and one portion of the alkali metal sulphide solution with an alkali metal acid sulphate to produce hydrogen sulphide and alkali metal sulphate and reacting upon the other portion of the solution of the alkali metal sulphide with the hydrogen sulphide to produce alkali metal sulphydrate.

3. The herein described process of making an alkali metal sulphydrate which comprises reducing an alkali metal sulphate by heating it in a reducing atmosphere with carbonaceous matter, to produce alkali metal sulphide and sulphate, leaching the cinder, to obtain a solution of such sulphide and sulphate, evaporating the solution to about 42° Baumé to precipitate alkali metal sulphate, removing the precipitate, diluting the remaining solution to about 34° Baumé and allowing it to cool to crystallize out a portion of the alkali metal sulphide present in the solution, dissolving the crystals thus formed with water, dividing such solution into two parts, treating the mother liquor and one portion of the alkali metal sulphide solution with an alkali metal acid sulphate to produce hydrogen sulphide and sulphate to produce hydrogen sulphide and alkali metal sulphate and reacting upon the other portion of the solution of the alkali metal sulphide with the hydrogen sulphide to produce alkali metal sulphydrate.

4. The herein described process of making sodium sulphydrate which comprises furnacing a mixture of sodium sulphate coal and coke in a reducing atmosphere at a temperature of from about 650° to 850° C. to produce sodium sulphide and sodium sulphate, leaching the cinder to obtain a solution of the sodium sulphide and sulphate, evaporating the solution to about 42° Baumé, to precipitate sodium sulphate, removing the precipitate, diluting the remaining solution to about 34° Baumé and allowing it to cool to crystallize out a portion of the sodium sulphide present in the solution, dissolving the crystals thus formed in water, dividing such solution into two parts, treating the said mother liquor and a portion of the sodium sulphide solution with a solution of nitre cake to produce hydrogen sulphide and sodium sulphate and reacting upon the other portion of the solution of the sodium sulphide with the hydrogen sulphide to produce sodium sulphydrate.

5. The herein described process of making sodium sulphydrate which comprises furnacing a mixture of sodium sulphate coal and coke in a reducing atmosphere at a temperature of from about 650° to 850° C. to produce sodium sulphide and sodium sulphate, leaching the cinder to obtain a solution of the sodium sulphide and sulphate, evaporating the solution to about 42° Baumé, to precipitate sodium sulphate, removing the precipitate, diluting the remaining solution to about 34° Baumé and allowing it to cool to crystallize out a portion of the sodium sulphide present in the solution, dissolving the crystals thus formed in water, dividing such solution into two parts, treating the said mother liquor and a portion of the sodium sulphide solution with a solution of nitre cake to produce hydrogen sulphide and sodium sulphate, reacting upon the other portion of the solution of the sodium sulphide with the hydrogen sulphide to produce sodium sulphydrate, and furnacing a mixture of coal, a portion of the cinder produced in the first step of the process and sodium sulphate produced in the subsequent steps of the process to produce sodium sulphide and sulphate in the further practice of the first step of the process.

In testimony whereof I affix my signature.

HARRY P. BASSETT.